United States Patent [19]
Nutile et al.

[11] Patent Number: 5,456,138
[45] Date of Patent: Oct. 10, 1995

[54] RETRACTABLE FOOT RETAINING CLIP AND METHOD

[76] Inventors: John F. Nutile, III, 253 Buffalo Trail;
Thomas R. Hillsamer, Jr., 404 W. Oak; Robert D. Case, 538 Hotevilla Trail, all of Flagstaff, Ariz. 86001

[21] Appl. No.: 131,620

[22] Filed: Oct. 5, 1993

[51] Int. Cl.⁶ .................................................. G05G 1/14
[52] U.S. Cl. .................... 74/594.6; 74/594.4; 74/594.7
[58] Field of Search ............................. 74/594.4, 594.6, 74/594.7; 36/131, 132

[56] References Cited

U.S. PATENT DOCUMENTS

| | | | |
|---|---|---|---|
| 493,696 | 3/1893 | Ferguson | 74/594.6 |
| 615,679 | 12/1898 | ConDell | 74/594.6 |
| 643,896 | 2/1900 | Goldsmith | 74/594.6 |
| 665,746 | 1/1901 | Madson | 74/594.6 |
| 2,831,370 | 4/1958 | Smith | 74/594.6 |
| 4,033,199 | 7/1977 | Bowder | 74/594.6 |
| 4,200,005 | 4/1980 | Mahr | 74/594.6 |
| 4,269,084 | 5/1981 | Okajma | 74/594.6 |
| 4,381,683 | 5/1983 | Takeda | 74/594.6 |
| 4,458,910 | 7/1984 | Stillwagon | 280/291 |
| 4,809,563 | 3/1989 | Loppnow | 74/534.6 |
| 4,915,375 | 4/1990 | Ginsburg | 74/594.6 |
| 4,969,373 | 11/1990 | Good | 74/594.6 |
| 5,005,825 | 4/1991 | Fogel | 74/594.6 X |
| 5,078,026 | 1/1992 | Giffin | 74/594.4 |
| 5,097,687 | 3/1992 | Turrin et al. | 74/594.6 |

FOREIGN PATENT DOCUMENTS

| | | | |
|---|---|---|---|
| 11818 | of 1893 | United Kingdom | 74/594.6 |
| 657886 | 9/1951 | United Kingdom | 74/594.6 |

*Primary Examiner*—Vinh T. Luong
*Attorney, Agent, or Firm*—Parsons & Associates; Don J. Flickinger; Robert A. Parsons

[57] ABSTRACT

A retractable foot retaining clip including a spindle assembly attached to a lateral member of a pedal. The spindle assembly includes a housing attached to the lateral member and containing a spindle. The spindle has a first position and a second position and includes a locking mechanism for maintaining the spindle in either one of the first and said second positions. The retractable foot retaining clip assembly further includes a foot retaining clip lever coupled to the spindle and extending across the pedal and a foot retaining bar coupled to a distal end of the foot retaining clip lever. The foot retaining bar extends across a front face of the pedal in a direction substantially parallel to a lateral member of the pedal.

12 Claims, 4 Drawing Sheets

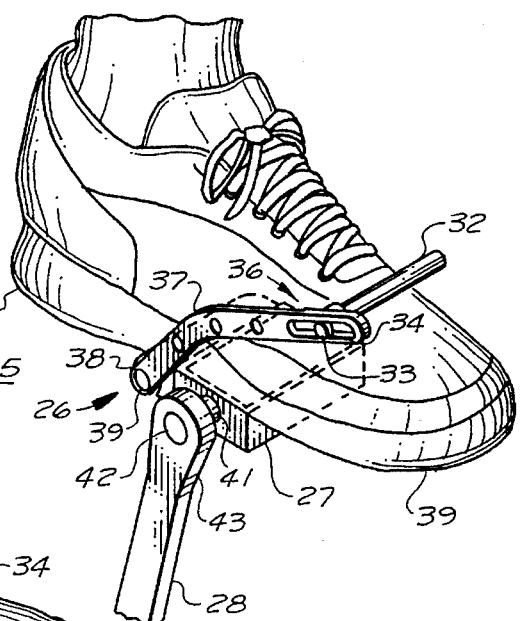
FIG. 1
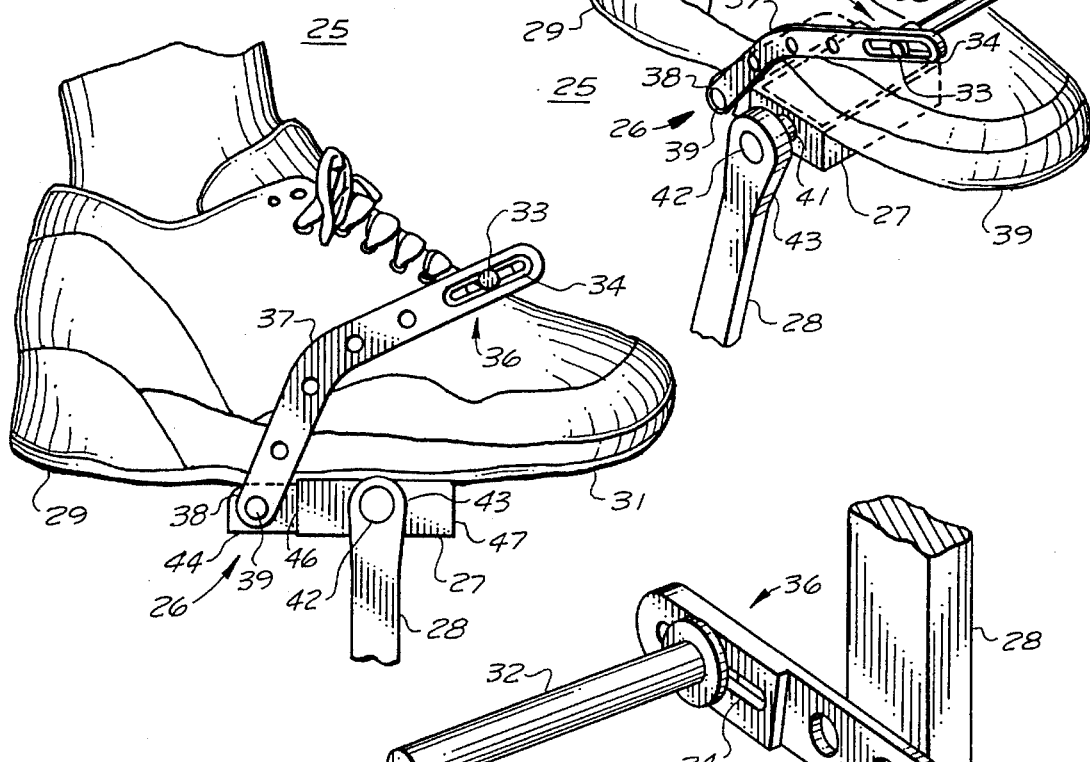
FIG. 2
FIG. 3
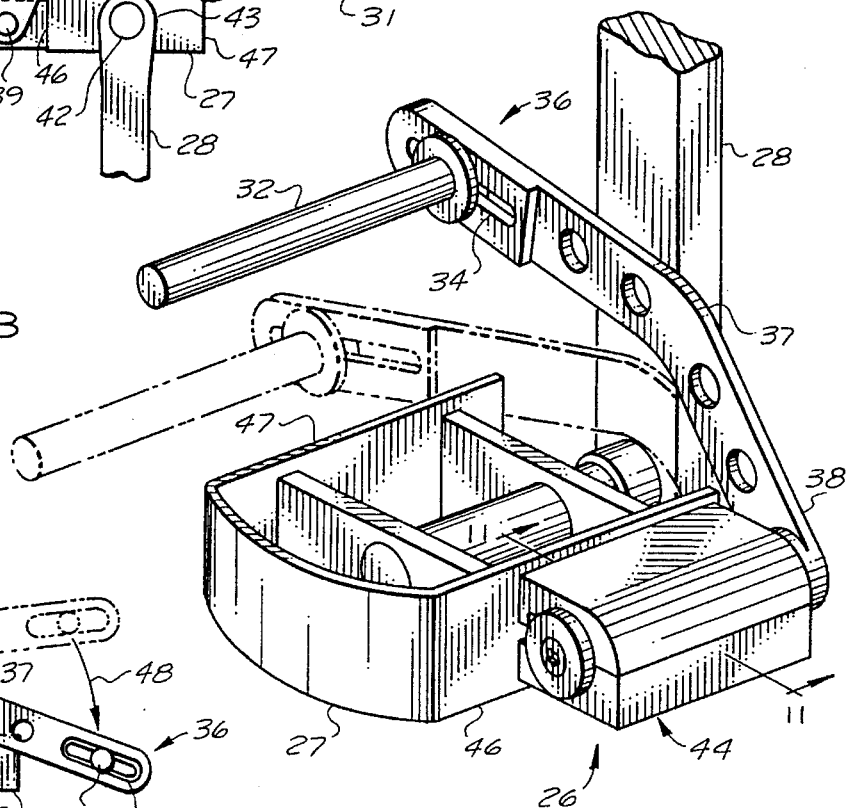
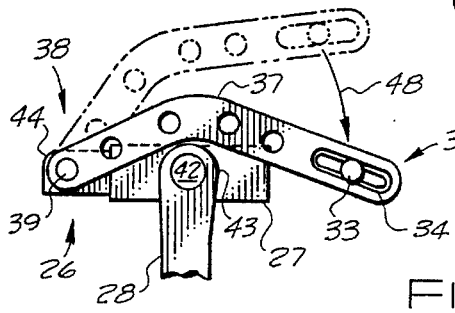
FIG. 4

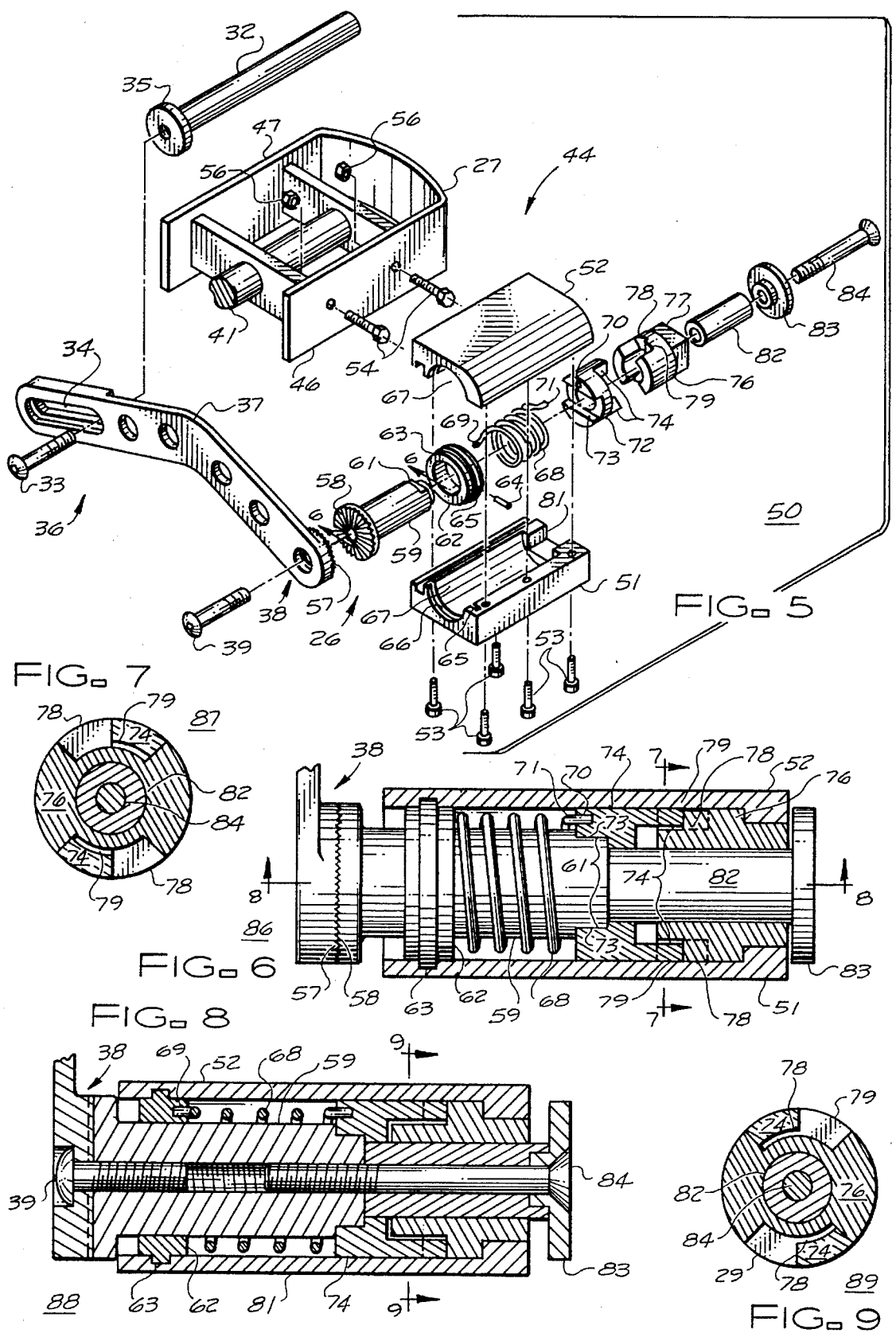

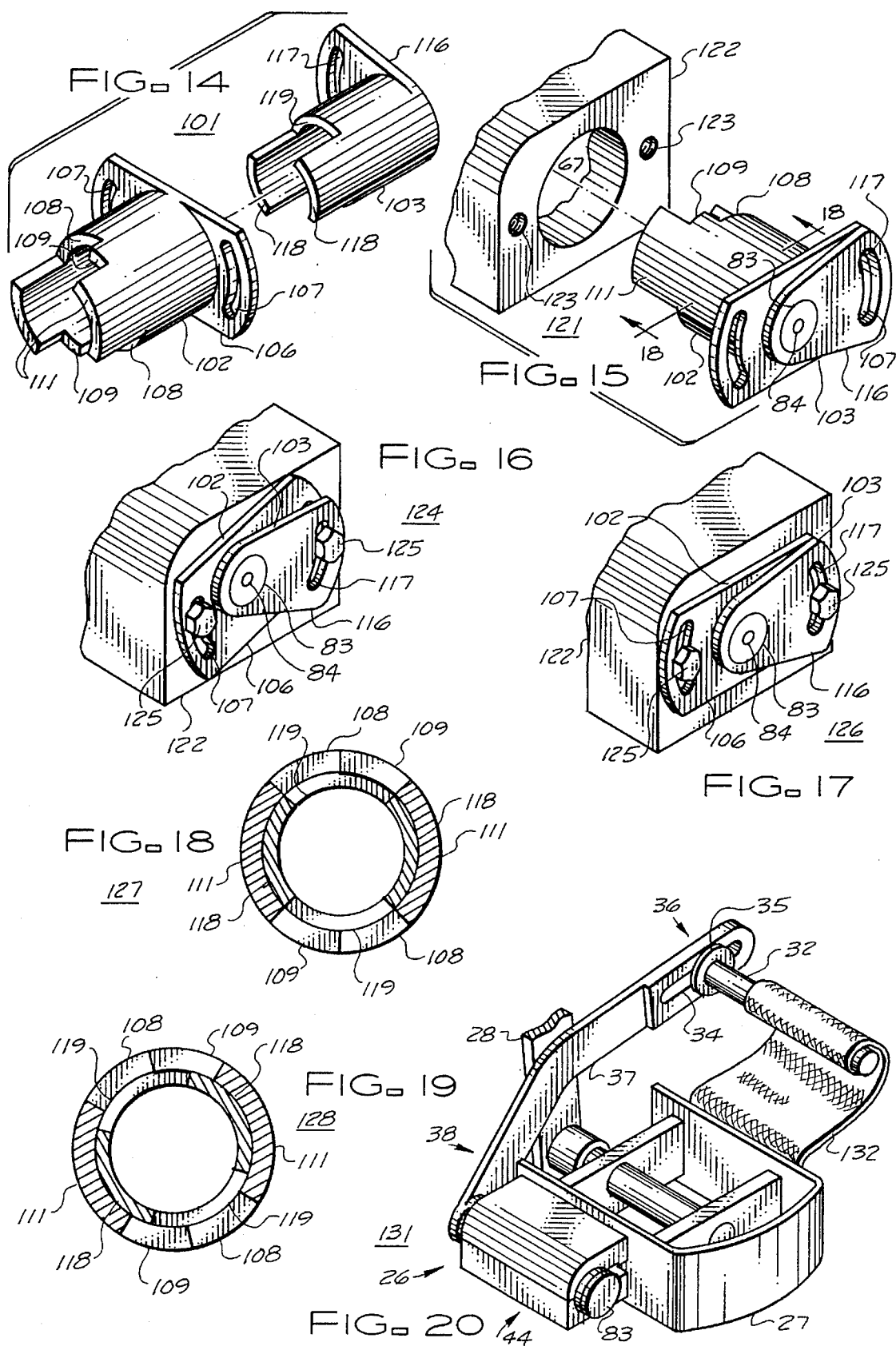

RETRACTABLE FOOT RETAINING CLIP AND METHOD

BACKGROUND OF THE INVENTION

1. Field of the Invention

This invention relates to foot retaining clips for retaining feet on pedals and for providing increased pedal utility.

More particularly, the present invention relates to a foot retaining clip adapted for use with a pedal such as a bicycle pedal or mountain bike pedal and which allows ready escape of the foot in the event that this is desired.

In a further and more specific aspect, the instant invention concerns an apparatus and a method for providing a foot retaining clip having a first extended position whereby a foot may be inserted therein and a second retracted position whereby the foot retaining clip is inconspicuously cached and does not interfere with normal operation of a pedal or pedalled vehicle.

2. Prior Art

Foot retaining clips of great variety in construction and purpose are often employed for securing a rider's foot to a pedal in applications such as bicycles, mountain bikes and motorcycles. As employed herein, the term "bicycle" is used for the sake of convenience and brevity to include other pedalled apparatus comprising bicycles, mountain bikes, pedal-operated boats, motorcycles and the like, tricycles, unicycles, tandem bicycles, exercise and gymnastic equipment and any other devices wherein pedals or pedalling apparatus are desired and/or useful.

Foot retaining clips provide improved foot contact with the pedal, reduce the probability that the foot may slip from the pedal during vigorous pedalling or riding and improve the efficiency of pedalling by allowing power to be delivered to the crankshaft from the rider during both the downstroke and also the upstroke of the foot. Many such foot retaining clips present problems to a rider, either in the course of normal use of the foot retaining clip or in those instances where the rider elects to pedal without the benefits of the foot retaining clip. A number of prior art foot retaining clips comprise loops of cloth, metal or other materials disposed on one side of the pedal, which arrangements are often referred to in the vernacular as "traps" indicative of the fact that the foot is trapped therein (i.e., lateral and forward foot motions are blocked) in the course of normal use.

A problem which has been encountered with such approaches is a tendency for the combination of the loops, etc. to weigh one side of the pedal (the side bearing the foot retaining clip) down and so present the other side of the pedal to the rider's foot, requiring that the rider somehow rotate the pedal "on the fly" in order to be able to insert a foot into the combined foot retaining clip and pedal. A further problem may be encountered in the event that the rider wishes to rapidly remove the foot from the foot retaining clip/pedal combination. Because foot retaining clips of this type tend to simultaneously restrict forward, vertical and sideways motion of the foot, the foot can only be extracted by rearward motion, which rearward motion may or may not be convenient or even possible in a given set of circumstances and which may impede the rider's ability to react to rapid changes in balance or traffic.

An additional problem which may be encountered arises when the rider elects not to employ the foot retaining clip but instead pedals using the other side of the pedal. The foot retaining clip then hangs beneath the pedal and may collide with or snag on objects disposed along the vehicle's trajectory, or with the roadway itself, for example in the course of executing turning maneuvers. This sequence of events can have disastrous results for the rider, particularly in the context of mountain bikes, where the actions of the rider, the nature of the terrain being traversed and the likelihood of encountering snaggable objects combine in such a way as to render likelihood of such a snag more probable.

Racing bicycles are generally provided with foot retaining and pedalling enhancement devices and often in a form differing from the "trap" type of foot retaining clip. One example employs a modified pedal having a socket disposed therein together with a modified shoe having a knob disposed on the sole thereof and adapted to "snap fit" the socket in the pedal.

However, the projecting knob renders the shoe poorly suited to walking and as well the pedal is poorly adapted for use without the shoe. The rider is obligated to employ the shoe in order to be able to ride with the convenience and utility expected and desired.

Further, the rider is restricted in the activities which the rider can carry out concomitant with riding the bicycle. This may cause inconvenience, either in the form of restricted scope of activity or in the need to carry (and change into and out of) additional footgear in order to be able to accommodate other activities, such as hiking, climbing, picnicking, photography and the like.

An additional problem often encountered in foot retaining clips of this sort results from the need for special pedals and the need to install the special pedals. It is cumbersome to remove the pedals in order to equip the bicycle with the special pedals or to reinstall conventional pedals not requiring a special shoe. It is thus inconvenient to ride the bicycle having the special pedals absent the special shoes or to (re)adapt the bicycle to be readily operable with normal shoes.

Accordingly, it is desirable to provide foot retaining clips allowing ready and easy foot ingress and egress, facilitating pedalling and without compromising foot mobility when the rider is not actively engaged in riding.

In order to combat these varied problems, some form of clip which acts to retain the foot and allow pedalling during both upstrokes and downstrokes is desired. It is extremely desirable to retain the foot without restraining the foot, allowing for ready disengagement of the foot on short notice and allowing disengagement in more than one direction.

The prior art has also provided variations of the above described apparatus for foot retaining clips or otherwise securing a rider's foot to a pedal to facilitate riding.

While the various mentioned prior art devices function as apparatus for securing or retaining a rider's foot to a pedal and/or facilitating pedalling, certain inherent deficiencies preclude adequate, satisfactory performance for the purpose of general riding comfort and safety in the event of any form of accident or mishap and in mounting and dismounting of the vehicle.

It would be highly advantageous, therefore, to remedy the foregoing and other deficiencies inherent in the prior art.

Accordingly, it is an object of the present invention to provide improvements in foot retaining clips for bicycle pedals which permit ready ingress of a foot.

Another object of the present invention is the provision of an improved foot retaining clip which facilitates ready and rapid egress of a foot.

And another object of the present invention is to provide an improved foot retaining clip having a first position which facilitates pedalling and having a second position which does not compromise rider safety or ease of use of the bicycle.

Still another object of the present invention is the provision of a foot retaining clip which is self-positioning in a way that facilitates entrance or placement of the foot.

Yet another object of the instant invention is to provide a foot retaining clip which attaches to the rear lateral aspect of the pedal and which facilitates pedal entrance and exit.

Yet still another object of the instant invention is the provision of a foot retaining clip which may be opened from the retracted position with a release button and spring mechanism.

And a further object of the invention is to provide a foot retaining clip which can be readily adopted by foot while "on the fly".

Still a further object of the immediate invention is the provision of a foot retaining clip which may be adjusted in heighth above the pedal and which provides an adjustable cross-member for accommodating differing foot and/or shoe sizes.

Yet a further object of the invention is to provide a detachable and adjustable toe strap for providing greater foot retention.

An additional object of the invention is to provide a foot retaining clip having a feature whereby the foot is provided with greater latitude of motion while in the foot retaining clip.

Yet a further additional object of the invention is to provide a foot retaining clip for a pedal which facilitates lateral or rear exit of the foot from the foot retaining clip.

And still a further object of the invention is the provision of a foot retaining clip, according to the foregoing, which is intended to latch in either of two positions, one of which is adapted for use as a foot retaining clip and the other of which does not compromise rider safety or ease of use of the pedal.

SUMMARY OF THE INVENTION

Briefly, to achieve the desired objects of the instant invention in accordance with a preferred embodiment thereof, provided is a retractable foot retaining clip which includes a spindle assembly attached to a lateral member of a pedal. The spindle assembly includes a housing attached to the lateral member. The housing contains a spindle. The spindle has a first position and a second position and includes a locking mechanism for maintaining the spindle in either one of the first and said second positions. The retractable foot retaining clip assembly further includes a foot retaining clip lever coupled to the spindle and extending across the pedal and a foot retaining bar coupled to a distal end of the foot retaining clip lever. The foot retaining bar extends across a front face of the pedal in a direction substantially parallel to a lateral member of the pedal.

The foot retaining clip desirably but not essentially includes a locking mechanism comprising a helical spring having a first end attached to the first end of the first dog and having a second end attached to the housing. The helical spring provides a bias such that the tangs rotate counterclockwise when allowed to. The locking mechanism further comprises a plunger adapted to fit through the first and second dogs along their mutual cylindrical axes and attached to the second end of the first cylinder. The plunger allows the tangs to be removed from the first openings to allow the first cylinder to rotate and thereby carry the foot retaining clip lever and the foot retaining bar to the first position from the second position when the plunger is depressed.

Also contemplated by the instant invention is a method for manufacturing a foot retaining clip. The method includes a step of providing a spindle assembly including a spindle contained in a housing, wherein the spindle has a first position and a second position and includes a locking mechanism for maintaining the spindle in either one of the first and the second positions and wherein the spindle assembly is adapted to be attached to a first lateral member of a pedal. The method includes a step of coupling a foot retaining clip lever via a proximal end to the spindle wherein the foot retaining clip lever extends across the pedal. The method further includes a step of coupling a foot retaining bar to a distal end of the foot retaining clip lever such that the foot retaining bar extends across a front face of the pedal in a direction substantially parallel to a lateral member of the pedal, wherein the first position corresponds to the foot retaining bar being above the pedal, allowing a foot portion to be inserted between the foot retaining bar and the pedal and wherein the second position corresponds to the foot retaining bar being substantially in a plane of the pedal.

BRIEF DESCRIPTION OF THE DRAWINGS

The foregoing and further and more specific objects, features and advantages of the instant invention will become readily apparent to those skilled in the art from the following detailed description of preferred embodiments thereof taken in conjunction with the drawings in which:

FIG. 1 illustrates an isometric view of a bicycle pedal, foot retaining clip and foot and a shank portion, in accordance with the teachings of the instant invention;

FIG. 2 depicts an enlarged side view of the foot, pedal, foot retaining clip and shank portion of FIG. 1;

FIG. 3 illustrates a further enlarged isometric view of a first preferred embodiment of the pedal, foot retaining clip and shank portion of FIGS. 1 and 2, showing a first and a second position of the foot retaining clip, in accordance with the teachings of the instant invention;

FIG. 4 illustrates a side view of the pedal, foot retaining clip and shank portion of FIGS. 1 through 3;

FIG. 5 illustrates an exploded view of the assembly of FIGS. 1 through 4, illustrating the constituent elements and relative placements thereof;

FIG. 6 illustrates a further enlarged side view, in longitudinal section taken along a longitudinal axis, section lines 6—6 of FIG. 5, of a portion of the foot retaining clip spindle assembly of FIGS. 1 through 5, illustrating the elements thereof in assembled form in a first position;

FIG. 7 illustrates a further enlarged side view, in cross-section, of a portion of the foot retaining clip spindle assembly of FIGS. 1 through 6, taken along section lines 7—7 of FIG. 6, illustrating a first position of the first and second dogs;

FIG. 8 illustrates a cutaway side view, in longitudinal section taken along a longitudinal axis, section lines 8—8 of FIG. 6, of a portion of the foot retaining clip spindle assembly of FIGS. 1 through 7, illustrating internal elements thereof in more detail in a second position;

FIG. 9 depicts a further enlarged side view, in cross-section, of a portion of the foot retaining clip spindle assembly of FIGS. 1 through 8, taken along section lines 9—9 of FIG. 8, illustrating a second position of the first and second dogs;

FIG. 14 illustrates an exploded view of a second preferred embodiment of the second dog for the foot retaining clip spindle assembly of FIGS. 1 through 5;

FIG. 15 illustrates an exploded view of the second preferred embodiment of the dogs for the foot retaining clip spindle assembly of FIG. 14, showing the dog's relative position with respect to the spindle housing;

FIG. 16 illustrates a detailed isometric view of a portion of the spindle housing, illustrating the second preferred embodiment of the second dog in a first position thereof;

FIG. 17 illustrates a detailed isometric view of a portion of the spindle housing, illustrating the second preferred embodiment of the second dog in a second position thereof;

FIG. 18 illustrates a cross-sectional view of the second preferred embodiment of the second dog of FIGS. 14 through 17 taken along section lines 18—18 of FIG. 15, illustrating the second dog element's relative positions in the first position;

FIG. 19 depicts a cross-sectional view of the second preferred embodiment of the second dog, illustrating the second dog element's relative positions in the second position; and FIG. 20 is an illustration of a toe strap and foot retaining clip, pedal and shank portion for the apparatus of FIGS. 1 through 19.

DETAILED DESCRIPTION OF THE PREFERRED EMBODIMENT

Figure 10:
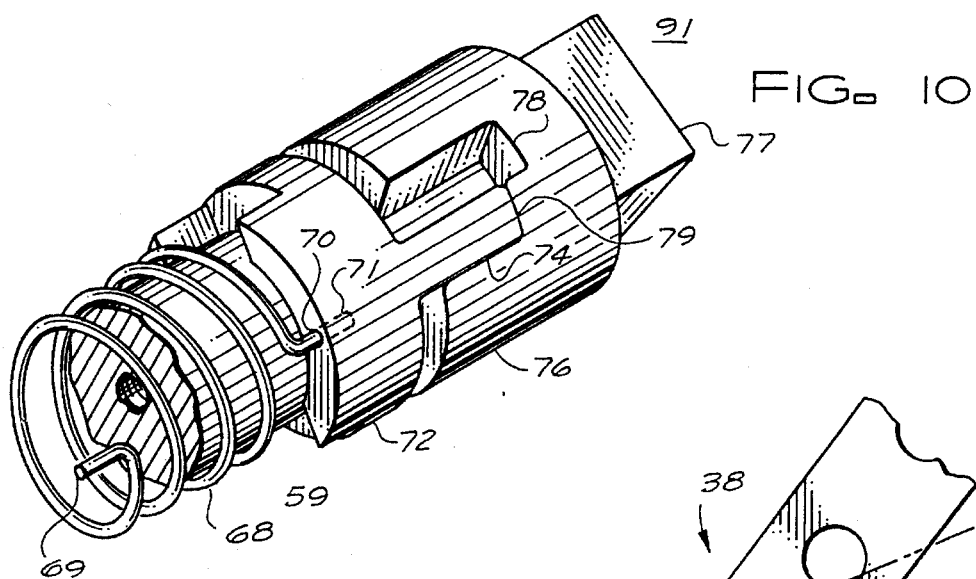
FIG. 10 depicts an enlarged and detailed isometric view of the first and second dogs and the helical spring of the foot retaining clip spindle assembly of FIGS. 1 through 9.

Turning now to the drawings, in which like reference characters indicate corresponding elements throughout the several views, attention is first directed to FIG. 1 which illustrates foot retaining clip 26, pedal 27, shank portion 28 and foot 29 in accordance with the teachings of the instant invention and generally designated by the reference character 25. In accordance with the configuration chosen for purposes of illustration, FIG. 1 is an isometric view, showing toe portion 31 of foot 29 captive between foot retaining bar 32 and pedal 27. Foot retaining bar 32 is secured to distal end 36 of foot retaining clip lever 37 by screw 33. Screw 33 passes through opening 34 in distal end 36 and then into a first end of foot retaining bar 32. The position of foot retaining bar 32 is readily adjusted to accommodate varying sizes of toe portion 31. This is effected by (i) loosening screw 33, (ii) positioning foot retaining bar 32 as desired and then (iii) tightening screw 33, to provide the first end of foot retaining bar 32 with a fixed position along opening 34. Foot retaining clip lever 37 is secured at proximal end 38 by screw 39, as is examined in greater detail in connection with FIG. 5 and associated text, infra.

Pedal 27 is secured via spindle 41 to eye 42 in distal end 43 of shank portion 28 and power is transferred from foot 29 via shank portion 28 on both downstrokes and upstrokes when foot retaining clip 26 is employed as illustrated.

FIG. 2 depicts an enlarged side view of foot 29, pedal 27, foot retaining clip 26 and shank portion 28 of FIG. 1, illustrating foot 29 in relationship to foot retaining clip 26 and pedal 27 in more detail. Foot retaining clip spindle assembly 44 is attached to proximal end 38 of foot retaining clip lever 37 via screw 39 and foot retaining clip spindle assembly 44 is secured to rear riser or lateral member 46 of pedal 27.

FIG. 3 illustrates a further enlarged isometric view of a first preferred embodiment of pedal 27, foot retaining clip 26 and shank portion 28 of FIGS. 1 and 2, showing a first, extended or open (solid outline) position and a second, closed or retracted (dotted outline) position of foot retaining clip 26, in accordance with the teachings of the instant invention. In the second (closed) position, foot retaining clip 26 is fully retracted and is effectively contained in the plane of pedal 27, with foot retaining bar 32 parallel to forward riser or lateral member 47 of pedal 27. Foot retaining clip 26 thus provides increased effective bearing area for pedal 27 in the retracted position and does not provide significant obstruction to pedalling activity or substantial likelihood of snagging on brush, etc. or of scraping a roadway during normal biking or mountain biking manoeuvres.

FIG. 4 illustrates a side view of pedal 27, foot retaining clip 26 and shank portion 28 of FIGS. 1 through 3, depicting foot retaining clip lever 37 in first (dotted outline) and second (solid outline) positions. Foot retaining clip lever 37 is hingedly attached to foot retaining clip spindle assembly 44 at proximate end 38 via screw 39 and rotates thereabout between first and second positions, corresponding to open and retracted positions, respectively, as indicated by direction arrow 48 in response to actions of a rider (not illustrated).

Referring now to FIG. 5, an exploded view of the assembly of FIGS. 1 through 4 is provided, illustrating constituent elements and relative placement thereof and generally designated by the reference character 50. Foot retaining clip spindle assembly 44 is secured to rear lateral member 46 of pedal 27 via screws 54 and nuts 56, for example, although other connective apparatus (e.g., rivets) may be employed. Foot retaining clip spindle assembly 44 comprises upper housing 52 and lower housing 51 secured together via screws 53. Foot retaining clip spindle assembly 44 has hollow interior 67 adapted to provide groove 66 at a first end thereof and square opening 81 at a second end thereof. Collar 62 has ridge 63 adapted to rest in and be captured by groove 66 when upper housing 52 is secured to lower housing 51 by screws 53. Collar 62 also has pin 64 inserted into opening 65' and adapted to be captured by opening 65 in upper 52 and/or lower 51 housings, securing collar 62 against rotation relative to housings 51 and 52 when housings 51 and 52 are fastened together.

Proximal end 38 of foot retaining clip lever 37 has serrations 57 adapted to mate to serrations 58 disposed on a first end of cylinder 59 when secured thereto via screw 39. Serrations 57 and 58 allow comparatively fine adjustment of the relative positions of foot retaining clip lever 37 and cylinder 59, in turn permitting fine adjustments of the position of foot retaining bar 32 in the raised or open position of foot retaining clip 26, for example, for increased rider comfort during pedalling.

Cylinder 59 has squared end 61 disposed at a second end thereof. Squared end 61 is adapted to fit into slot 73 disposed at a first end of first dog 72 such that when cylinder 59 is fitted into first dog 72, cylinder 59 and first dog 72 rotate together. First dog 72 is also coupled to collar 62 via helical spring 68 having first end 69 and second end 71. Second end 71 is adapted to fit into hole 70 in first dog 72 and a similar arrangement (not illustrated in FIG. 5) captures first end 69 of helical spring 68 in collar 62. Helical spring 68 biases foot retaining clip 26 fully open in the open position. First dog 72 is coupled to second dog 76 via tangs 74, which rest in either openings 78 (in the second position of foot retaining clip 26 illustrated in FIGS. 3 and 4) or openings 79 (in the first position illustrated in FIGS. 3 and 4) of second dog 76.

Second dog 76 has squared end 77 adapted to be captured in square openings 81 disposed at the second end of upper housing 51 and lower housing 52 when assembled via screws 53, fixing second dog 76 against rotation relative to upper housing 51 and lower housing 52. Cylinder 59 is secured via screw 84 against cylinder 82 and button 83, causing cylinder 59 to securely engage first dog 72 and in turn causing first dog 72 to engage second dog 76 as described hereinabove.

Also shown in FIG. 5 are foot retaining bar or crossmember 32 having shoulder 35 together with screw 33. Screw 33 holds foot retaining bar 32 and shoulder 35 against distal end 36 of foot retaining clip lever 37 and allows adjustment of the position of foot retaining bar 32 along opening 34 for improved fit and comfort, for example, and allows simple and easy adjustments to foot retaining clip 26 to accommodate differing foot sizes, varying sizes of shoe and the like.

FIG. 6 illustrates a further enlarged side view, in longitudinal section, of portion 86 of foot retaining clip spindle assembly 44 of FIGS. 1 through 5, illustrating the elements thereof in assembled form in the first position. Portion 86 shows helical spring 68 surrounding cylinder 59 and having second end 71 inserted into opening 70 of first dog 72, spring loading first dog 72 into the first position, with tangs 74 resting within openings 79 (in the first position of foot retaining clip 26 as illustrated in FIGS. 3 and 4). This position may be effected by pushing button 83 into the position illustrated in FIG. 6 and allowing helical spring 68 to bias foot retaining clip lever 37 into an extended position, for example.

FIG. 7 illustrates a further enlarged side view, in cross-section, of portion 87 of foot retaining clip spindle assembly 44 of FIGS. 1 through 6, taken along section lines 7—7 of FIG. 6, illustrating a first position of tangs 74 of first dog 72 relative to openings 78 and 79 of second dog 76. Tangs 74 are shown locked into openings 79, maintaining foot retaining clip 26 (FIGS. 1 through 4) in the first (extended or open) position.

FIG. 8 illustrates a cutaway side view, in longitudinal section, of portion 88 of foot retaining clip spindle assembly 44 of FIGS. 1 through 7, illustrating internal elements thereof in more detail in a second position. First dog 72 is coupled to second dog 76 via tangs 74, which rest in openings 78 (in the second position of foot retaining clip 26 as illustrated in FIGS. 3 and 4). This position may be effected by pressing button 83, causing tangs 74 to slip into opening 78 and releasing spring 68 to force foot retaining clip lever 37 upwards.

FIG. 9 illustrates a further enlarged side view, in cross-section, of portion 89 of foot retaining clip spindle assembly 44 of FIGS. 1 through 8, taken along section lines 9—9 of FIG. 8, illustrating a second position of tangs 74 of first dog 72 relative to openings 78 and 79 of second dog 76. Tangs 74 are shown locked into openings 78, maintaining foot retaining clip 26 (FIGS. 1 through 4) in the second (retracted or closed) position.

FIG. 10 illustrates an enlarged and detailed isometric view of portion 91 comprising first dog 72, second dog 76 and helical spring 68 of foot retaining clip spindle assembly 44 of FIGS. 1 through 9. Tangs 74 of first dog 72 are illustrated nested in opening 79, corresponding to the extended or first position (FIGS. 3 and 4) of foot retaining clip 26 of FIGS. 1 through 5.

Figure 11:
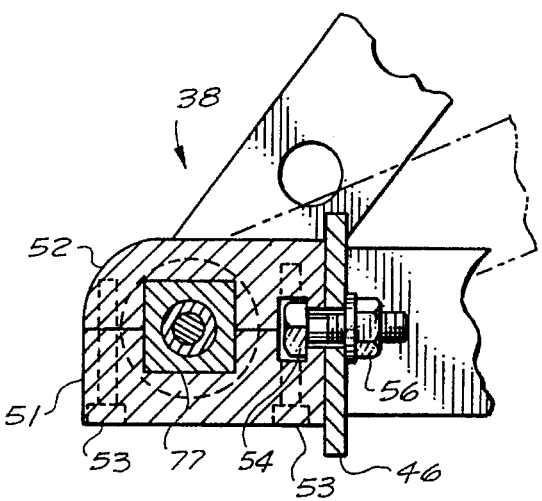
FIG. 11 is a sketch showing a sectional view of a portion of the spindle and clip of FIGS. 1 through 5 taken along section lines 11—11 of FIG. 3.

FIG. 11 is a sketch showing a detailed side view of portion 92 of the spindle and clip portion of FIGS. 1 through 5, depicting proximal end 38 of foot retaining clip lever 37 in the extended or first position (solid outline) and in the retracted or second position (dotted outline). Also shown in FIG. 11 is the relationship between screws 53, securing upper housing 52 to lower housing 51, and bolts 54, securing upper 52 and lower 51 housings to lateral member 46 of pedal 27 (FIGS. 1 through 5).

Figure 12:
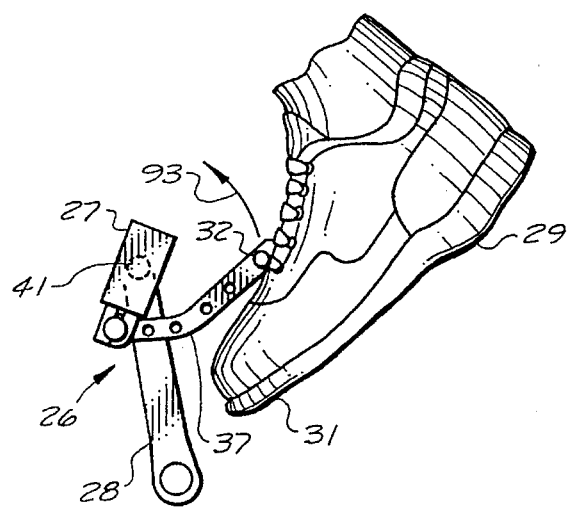
FIG. 12 depicts a side view of the foot retaining clip, pedal, shank and foot of FIGS. 1 and 2, illustrating an initial position of the foot relative to the foot retaining clip and pedal during mounting of a bicycle.
Figure 13:
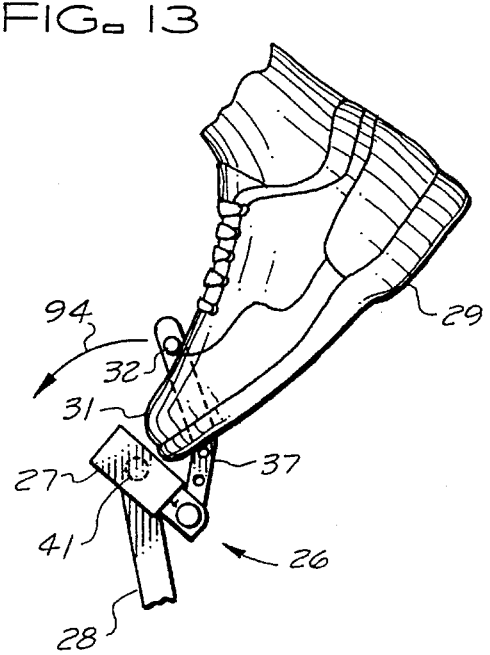
FIG. 13 depicts a side view of the foot retaining clip, pedal, shank portion and foot of FIGS. 1, 2 and 12, illustrating an intermediate position of the foot relative to the foot retaining clip and pedal during mounting or dismounting of the bicycle.

Referring now to FIGS. 12 and 13, a mounting or dismounting sequence is shown, exemplifying the ease with which a rider is able to insert or retract foot 29 into or from foot retaining clip 26 "on the fly". For simplicity, FIGS. 12 and 13 are described as presenting a mounting sequence, however, it will be appreciated that by reversing the order in which the figures are considered, a dismounting sequence is also presented.

FIG. 12 depicts a side view of foot retaining clip 26, pedal 27, shank portion 28 and foot 29 of FIGS. 1 and 2, illustrating an initial position of foot 29 relative to foot retaining clip 26 and pedal 27 during mounting of a bicycle (not illustrated). The attitude which foot retaining clip 26 adopts in response to gravity when in the open position, illustrated in FIG. 12, facilitates foot engagement and provides a useful self-positioning feature. Toe portion 31 approaches foot retaining bar 32 from beneath, as shown in FIG. 12, taking advantage of the normal attitude which pedal 27 and foot retaining clip 26 adopt in response to gravity. Toe portion 31 then is pressed against foot retaining bar 32, causing foot retaining clip 26 and pedal 27 to rotate about pedal spindle 41 in a direction indicated by direction arrow 93 to arrive at the position illustrated in FIG. 13.

FIG. 13 depicts a side view of foot retaining clip 26, pedal 27, shank portion 28 and foot 29 of FIGS. 1, 2 and 12, illustrating an intermediate position of foot 29 relative to foot retaining clip 26 and pedal 27 during mounting or dismounting of the bicycle (not illustrated). Toe portion 31 is shown beneath foot retaining bar 32, meeting pedal 27. During mounting, as toe portion 31 continues to press against foot retaining bar 32, foot retaining clip 26 and pedal 27 continue to rotate about pedal spindle 41 in a direction indicated by direction arrow 94, ending in a position as illustrated in FIGS. 1 and 2.

FIGS. 12 and 13 show that mounting of a bicycle equipped with foot retaining clip 26 can proceed in a smooth and natural fashion, without the fumbling, etc. which may be required to employ some prior art types of foot retaining clip. At the same time, egress from foot retaining clip 26 is not obstructed or compromised, nor is the rider distracted to the extent and/or degree which may accompany fitting one's foot into some types of prior art foot retaining clip.

Turning now to FIGS. 14 through 19, a second preferred embodiment of second dog 76 of FIGS. 5 through 9 is illustrated, which allows adjustment of the positions of foot retaining bar 32 and foot retaining clip lever 37 to accommodate a particular foot size, shoe or boot, in order to increase rider satisfaction and pedalling efficiency, among other things.

FIG. 14 is an exploded view of second preferred embodiment 101 of second dog 76 (FIGS. 5 through 9) for foot retaining clip spindle assembly 44 of FIGS. 1 through 5. Second preferred embodiment 101 comprises first portion 102 and second portion 103, nested together as suggested by the view provided in FIG. 14 and shown more explicitly in FIGS. 15 through 19.

First portion 102 has tangs 111 and openings 108 and 109, analogous to openings 78 and 79 of second dog 76 (FIGS. 5 through 9), respectively. First portion 102 also has flange 106 having slots 107 disposed therein attached to a rear portion thereof. Second portion 103 has tangs 118 and openings 119 disposed on a forward portion thereof and has flange 116 having slot 117 disposed therein attached to a rear portion thereof.

FIG. 15 is an exploded view of the second preferred embodiment of FIG. 14, showing first portion 102 and second portion 103 relative to spindle housing 122 and generally designated by the reference character 121. Spindle housing 122 has screw holes 123 substantially aligned with slots 107 and 117 of forward 102 and rear 103 portions. Second portion 103 nests within first portion 102 and these together extend into cavity 67 of housing 122, analogous to assembly of second dog 76 (FIG. 5) within upper housing 52 and lower housing 51 and mating portion 102 and 103 with first dog 72 (FIGS. 5 through 10).

Referring now to FIGS. 16 through 19, a first relative position of first portion 102 and second portion 103 (FIGS. 16 and 18) and a second relative position of first portion 102 and second portion 103 (FIGS. 17 and 19) are illustrated from several perspectives. Screw 84, button 83 and other components extend through the hollow centers of first portion 102 and second portion 103 in a fashion analogous to that exemplified in FIG. 5 and associated text. First portion 102 permits adjustment of the positions of foot retaining bar 32 and foot retaining clip lever 37 relative to pedal 27 in the closed position while second portion 103 permits adjustment of the positions of foot retaining bar 32 and foot retaining clip lever 37 relative to pedal 27 in the open position.

FIG. 16 is a detailed isometric view of portion 124 of spindle housing 122, illustrating first portion 102 and second portion 103 locked into a first position by screws 125 extending through slot 107 and/or slots 107 and 117 and tightened into screw holes 123 (FIG. 15), securing first portion 102 and second portion 103 against rotation with respect to spindle housing 122 in a fashion analogous to that effected via squared end 77 of second dog 76 and square openings 81 (see FIG. 5).

FIG. 18 provides cross-sectional view 127 of first portion 102 and second portion 103 of FIGS. 14 through 17, illustrating relative positions of tang 111 of first portion 102 and tang 118 of second portion 103 in the first position. Tang 118 of second portion 103 is substantially aligned with tang 111 of first portion 102, leaving openings 108 and 109 unobstructed and adjacent opening 119 of second portion 103. Opening 119 is desirably deeper than opening 108. In the position illustrated in FIGS. 16 and 18, first portion 102 and second portion 103 provide operation similar to that of rear dog 76 (FIG. 5).

FIG. 17 is a detailed isometric view of portion 126 of spindle housing 122, illustrating first portion 102 and second portion 103 locked into a second position by screws 125 extending through slot 107 and/or slots 107 and 117 and tightened into screw holes 123 (FIG. 15), securing first portion 102 and second portion 103 against rotation relative to spindle housing 122.

FIG. 19 provides cross-sectional view 128 of tangs 111 of first portion 102 and tangs 118 of second portion 103 of FIGS. 14 through 17, illustrating relative positions of tangs 111 and 118 in the second position. Tang 118 of second portion 103 is not substantially aligned with tang 111 of first portion 102 and partially occludes opening 109, restricting foot retaining clip lever 37 and foot retaining bar 32 (FIGS. 1 through 5, 12 and 13) from full extension and so accommodating a smaller foot 31, shoe or boot with a snug, comfortable and functional fit. The degree to which tang 118 of second portion 103 occludes opening 108 is adjustable by (i) loosening screws 125 (FIGS. 16 and 17), (ii) rotating flanges 106 and 116 to provide empirically determined optimal positions of foot retaining clip lever 37 and foot retaining bar 32 and then (iii) tightening screws 125 to lock flanges 106 and 116 in place, thereby securing first portion 102 and second portion 103 into a desired position corresponding to a particular position of foot retaining bar 32 with respect to pedal 27 (see FIGS. 1 through 5). This simple sequence of three steps allows a variety of shoe sizes, etc. to be accommodated with relative convenience and ease.

FIG. 20 is an illustration of assembly 131 comprising optional toe strap 132 and foot retaining clip 26, pedal 27 and shank portion 28 for foot retaining clip 26 of FIGS. 1 through 5, 12 and 13. Optional toe strap 132 is secured at a first end to foot retaining bar 32 and at a second end to lateral member 47 of pedal 27 and provides increased comfort and pedalling efficiency. Toe strap 132 in cooperation with foot retaining bar 32 and/or helical spring 68 provides another technique for determining the position of foot retaining bar 32 in use in that pressure placed on toe strap 132 by toe portion 31 (FIGS. 1 and 2) causes foot retaining bar 32 to clasp toe portion 31 during normal use and further facilitating rapid egress if desired.

The foregoing detailed description of the several embodiments of the instant invention for the purposes of explanation have been particularly directed toward the application as selectively (i.e., when so chosen to) providing improved foot-to-pedal contact for a bicycle or a mountain bike. It will be appreciated that the invention is equally useful for other types of cycles, stationary footrests on other types of vehicles such as trail vehicles and exercise equipment having pedal capabilities.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A retractable foot retaining clip comprising:
   a spindle assembly attached to a first lateral member of a pedal, said spindle assembly including a housing containing a spindle, said spindle having a first position and a second position and including a locking mechanism for maintaining said spindle in either one of said first and said second positions;

a foot retaining clip lever having a proximal end coupled to said spindle, said foot retaining clip lever extending across said pedal; and a foot retaining bar coupled to a distal end of said foot retaining clip lever and extending across a front face of said pedal;

wherein said locking mechanism comprises:

a first cylinder forming a portion of said spindle and having a first end coupled to said proximal end of said foot retaining clip lever;

a first dog having an annular shape and having a first end adapted to couple with a second end of said first cylinder such that said first cylinder and said first dog rotate together, said first dog having a pair of tangs extending from a second end thereof, said first and second ends of said first dog being disposed at extremes with respect to one another along a cylindrical axis of said first dog; and a second dog having an annular shape and having a first and a second pair of openings disposed at a first end thereof, each of said first and second pairs of openings adapted to couple to said tangs, said first pair of openings having a first depth, said second pair of openings having a second depth, each of said openings of said first pair of openings disposed clockwise from each of said openings of said second pair of openings, wherein said first depth exceeds said second depth, said second dog having a means for securing said second dog against rotation disposed on a second end thereof, wherein said first and second ends of said second dog are disposed at extremes with respect to one another along a cylindrical axis of said second dog.

2. A retractable foot retaining clip as claimed in claim 1, wherein said locking mechanism includes a spring-biased release mechanism comprising:

a helical spring having a first end coupled to said first end of said first dog and having a second end coupled to said housing, said helical spring providing a bias such that said tangs will rotate counterclockwise when allowed to; and a plunger adapted to fit through said first and second dogs along said cylindrical axes and attached to said second end of said first cylinder, said plunger for allowing said tangs to be removed from said first pair of openings to allow said first cylinder to rotate and thereby carry said foot retaining clip lever and said foot retaining bar to said first position from said second position when said plunger is depressed.

3. A retractable foot retaining clip as claimed in claim 2, wherein said foot retaining bar includes an adjustable foot retaining bar comprising:

a cross member having a threaded hole disposed at a first end thereof;

wherein said foot retaining clip lever has a slot disposed at a distal end thereof and wherein said foot retaining clip lever is secured to said spindle housing at said proximal end thereof; and a screw extending from a first side of said foot retaining clip lever through said slot and into said threaded hole such that said cross member may slide along said slot to a desired position when said screw is loosened and such that said cross member is locked into position at said desired position when said screw is tightened.

4. A retractable foot retaining clip as claimed in claim 1, wherein said foot retaining clip lever includes a first cylinder forming a portion of said spindle and having a first end coupled to a proximal end of said foot retaining clip lever and having a second end coupled to said locking mechanism and having a hole disposed at said proximal end and adapted to accommodate a screw extending therethrough and threaded into a threaded hole in said first cylinder, said foot retaining clip lever including serrations radially disposed about said hole and adapted to mate with corresponding serrations radially disposed about said threaded hole, said serrations permitting angular adjustment of relative positions of said foot retaining clip lever with respect to said locking mechanism when said screw is loosened to provide a desired angular relationship and maintaining said desired angular relationship when said screw is tightened.

5. A retractable foot retaining clip comprising:

a spindle assembly attached to a first lateral member of a pedal, said spindle assembly including a housing containing a spindle, said spindle having a first position and a second position and including a locking mechanism for maintaining said spindle in either one of said first and said second positions;

a foot retaining clip lever having a proximal end coupled to said spindle, said foot retaining clip lever extending across said pedal; and a foot retaining bar coupled to a distal end of said foot retaining clip lever and extending across a front face of said pedal; and means for fine positional adjustment of said foot retaining bar relative to said pedal when said foot retaining bar is in said first position.

6. A retractable foot retaining clip as claimed in claim 5, wherein said means for adjusting includes:

a first cylinder forming a portion of said spindle and having a first end coupled to a proximal end of said foot retaining clip lever;

a first dog having a generally annular shape and having a first end adapted to couple with a second end of said first cylinder such that said second end and said first dog rotate together, said first dog having a first pair of tangs extending from a second end thereof, said first and second ends being disposed at extremes with respect to one another along a cylindrical axis of said first dog;

a second dog including a first member having a generally annular shape and having a second pair of tangs separated by first and second openings extending along a cylindrical axis of said first generally annular member, said first openings having a first depth, said second openings having a second depth and each disposed clockwise from one of said first openings, wherein said first depth exceeds said second depth, said first and second openings adapted to receive said first pair of tangs, said first member having a first flange including a slot adapted to accommodate a screw disposed on a second end thereof and orthogonal to a cylindrical axis thereof, said first and second ends of said first member being disposed at extremes with respect to one another along said cylindrical axis of said first member;

said second dog further including a second member having a generally annular shape adapted to fit within said first annular member and to align therewith along a mutual cylindrical axis, said second member having a first end including a third pair of tangs separated by a pair of openings deeper than said first and second openings of said first member and having a second flange disposed at a second end of said second member, said second flange orthogonally disposed with respect to a cylindrical axis of said second member and including a slot adapted to accommodate a screw, said first and second ends of said second member being externally disposed with respect to said cylindrical axis of said second member, said first and second members adapted to provide a variable angular relationship between said second and third pairs of tangs when said first and second members are not secured by a screw extending through said slots in said first and second flanges and further adapted to provide a known angular relationship between said second and third pairs of tangs when said first and second members are secured by a screw extending through said slots in said first and second flanges;

a helical spring having a first end attached to said first end of said first dog and having a second end attached to said housing, said helical spring providing a bias such that said tangs will rotate counterclockwise if allowed to; and a plunger adapted to fit through said first and second dogs along said cylindrical axes and attached to said second end of said first cylinder, said plunger for allowing said first pair of tangs to be removed from said first openings to allow said first cylinder to rotate, placing said first pair of tangs in said second openings and thereby carrying said foot retaining clip lever and said foot retaining bar to said first position from said second position when said plunger is depressed.

7. A retractable foot retaining clip comprising:

a spindle assembly attached to a first lateral member of a pedal, said spindle assembly including a housing containing a spindle, said spindle having a first position and a second position and including a locking mechanism for maintaining said spindle in either one of said first and said second positions;

a foot retaining clip lever having a proximal end coupled to said spindle, said foot retaining clip lever extending across said pedal;

a foot retaining bar coupled to a distal end of said foot retaining clip lever and extending across a front face of said pedal; and a toe strap extending from said foot retaining bar to a second lateral member of said pedal, wherein a first end of said toe strap is secured to said foot retaining bar and a second end of said toe strap is secured to said foot retaining bar and a second end of said toe strap is secured to said second lateral member.

8. A retractable foot retaining clip, comprising:

a spindle assembly attached to a first lateral member of a pedal, said spindle assembly including a housing containing a spindle, said spindle having a first position and a second position and including a locking mechanism for maintaining said spindle in either one of said first and said second positions;

a foot retaining clip lever having a proximal end coupled to said spindle, said foot retaining clip lever extending across said pedal;

a foot retaining bar coupled to a distal end of said foot retaining clip lever and extending across a front face of said pedal; and wherein said locking mechanism comprises:

a helical spring having a first end coupled to said spindle and having a second end coupled to said housing, said helical spring providing a bias such that said spindle will rotate counterclockwise when allowed to; and a plunger adapted to fit through a portion of said spindle along a cylindrical axis thereof, said plunger unlocking said locking mechanism and causing said spindle to rotate and thereby carry said foot retaining clip lever and said foot retaining bar to said first position from said second position when said plunger is depressed.

9. A retractable foot retaining clip as claimed in claim 8, further including:

said foot retaining bar having a threaded hole disposed at a first end thereof;

wherein said foot retaining clip lever has a slot disposed at said distal end; and a bolt extending from a first side of said foot retaining clip lever through said slot and into said threaded hole such that said foot retaining bar may slide along said slot to a desired position when said bolt is loosened and such that said foot retaining bar is locked into position at said desired position when said bolt is tightened.

10. A retractable foot retaining clip as claimed in claim 8, further including a toe strap extending from said foot retaining bar to a second lateral member of said pedal, wherein a first end of said toe strap is secured to said foot retaining bar and a second end of said toe strap is secured to said second lateral member.

11. A retractable foot retaining clip as claimed in claim 8, wherein said spindle and locking mechanism further include:

a first cylinder forming a portion of said spindle and having a first end coupled to said proximal end of said foot retaining clip lever;

a first dog having an annular shape and having a first end adapted to couple with a second end of said first cylinder such that, when coupled, said first cylinder and said first dog rotate together, said first dog having a pair of tangs extending from a second end thereof, said first and second ends of said first dog being disposed at extremes with respect to one another along a cylindrical axis of said first dog; and a second dog having an annular shape and having a first and a second pair of openings disposed at a first end thereof, each of said first and second pairs of openings adapted to couple to said tangs, said first pair of openings having a first depth, said second pair of openings having a second depth, each of said openings of said first pair of openings disposed clockwise from each of said openings of said second pair of openings, wherein said first depth exceeds said second depth, said second dog having a means for securing said second dog against rotation disposed on a second end thereof, wherein said first and second ends of said second dog are disposed at extremes with respect to one another along a cylindrical axis of said second dog.

12. A retractable foot retaining clip as claimed in claim 8, further including:

a first cylinder forming a portion of said spindle and having a first end coupled to said proximal end of said foot retaining clip lever;

a first dog having an annular shape and having a first end adapted to couple with a second end of said first cylinder such that said second end and said first dog rotate together, said first dog having a first pair of tangs extending from a second end thereof, said first and second ends being disposed at extremes with respect to one another along a cylindrical axis of said first dog;

a second dog including a first member having an annular shape and having a second pair of tangs separated by first and second openings extending along a cylindrical axis of said first member, said first openings having a first depth, said second openings having a second depth and each disposed clockwise from one of said first openings, wherein said first depth exceeds said second depth, said first and second openings adapted to receive said first pair of tangs, said first member having a first flange including a slot adapted to accommodate a screw disposed on a second end thereof and orthogonal to a cylindrical axis thereof, said first and second ends of said first member being disposed at extremes with respect to one another along said cylindrical axis of said first member;

said second dog further including a second member having an annular shape and adapted to fit within said first member and to align therewith along a mutual cylindrical axis, said second member having a first end including a third pair of tangs separated by a pair of openings deeper than said first and second openings of said first member and having a second flange disposed at a second end of said second member, said second flange orthogonally disposed with respect to a cylindrical axis of said second member and including a slot adapted to accommodate a screw, said first and second ends of said second member being externally disposed with respect to a cylindrical axis of said second member, said first and second members adapted to provide a variable angular relationship between said second and third pairs of tangs when said first and second members are not secured by a screw extending through said slots in said first and second flanges and further adapted to provide a fixed angular relationship between said second and third pairs of tangs when said first and second members are secured by a screw extending through said slots in said first and second flanges;

a helical spring having a first end attached to said first end of said first dog and having a second end attached to said housing, said helical spring providing a bias such that said first pair of tangs rotate counterclockwise when allowed to; and a plunger adapted to fit through said first and second dogs along said mutual cylindrical axis and attached to said second end of said first cylinder, said plunger for removing said first pair of tangs from said first openings to allow said first cylinder to rotate, placing said first pair of tangs in said second openings and thereby carrying said foot retaining clip lever and said foot retaining bar to said first position from said second position when said plunger is depressed.

* * * * *